Figure 7:
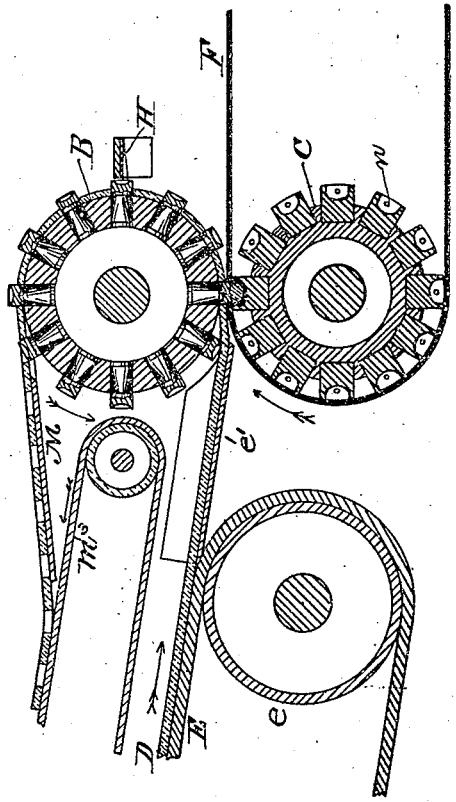

(No Model.) 3 Sheets—Sheet 1.
M. E. HUNTER & J. O. CLARK.
MACHINE FOR MOLDING OVAL OR OTHER SHAPES FROM PLASTIC MATERIAL.
No. 492,206. Patented Feb. 21, 1893.
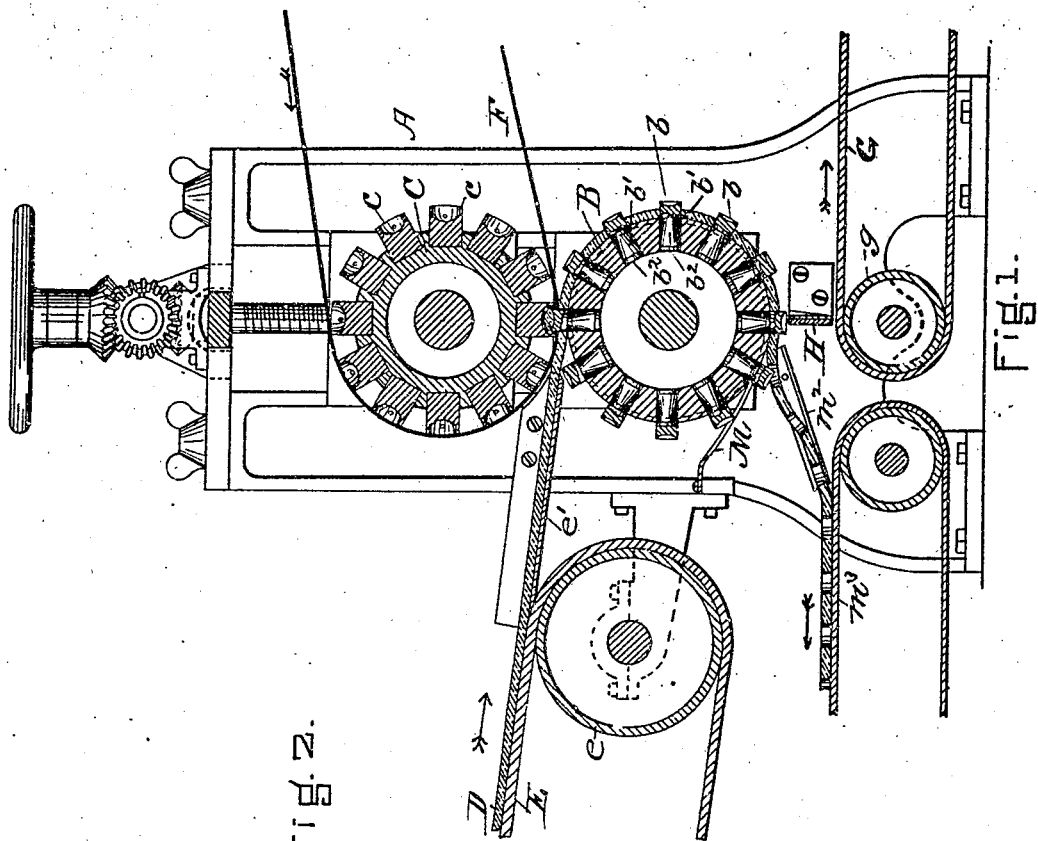
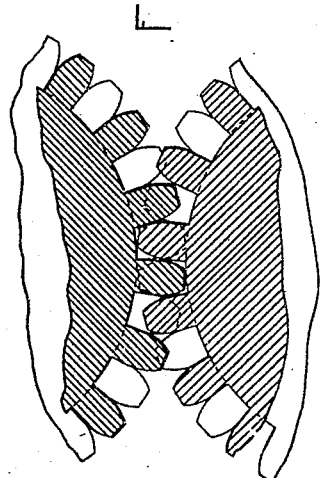
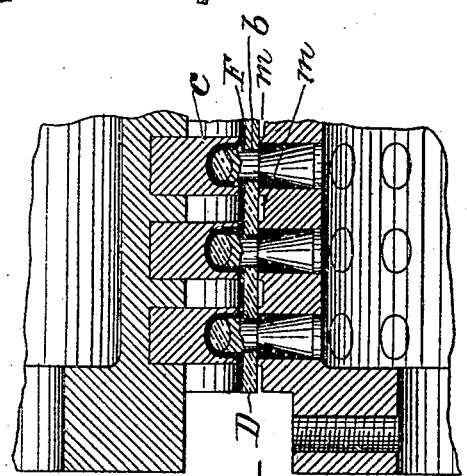
WITNESSES.
J. M. Dolan
Wm. McTague
INVENTORS
Marshall E. Hunter
Joseph O. Clark
by their Attys
Clarke & Raymond

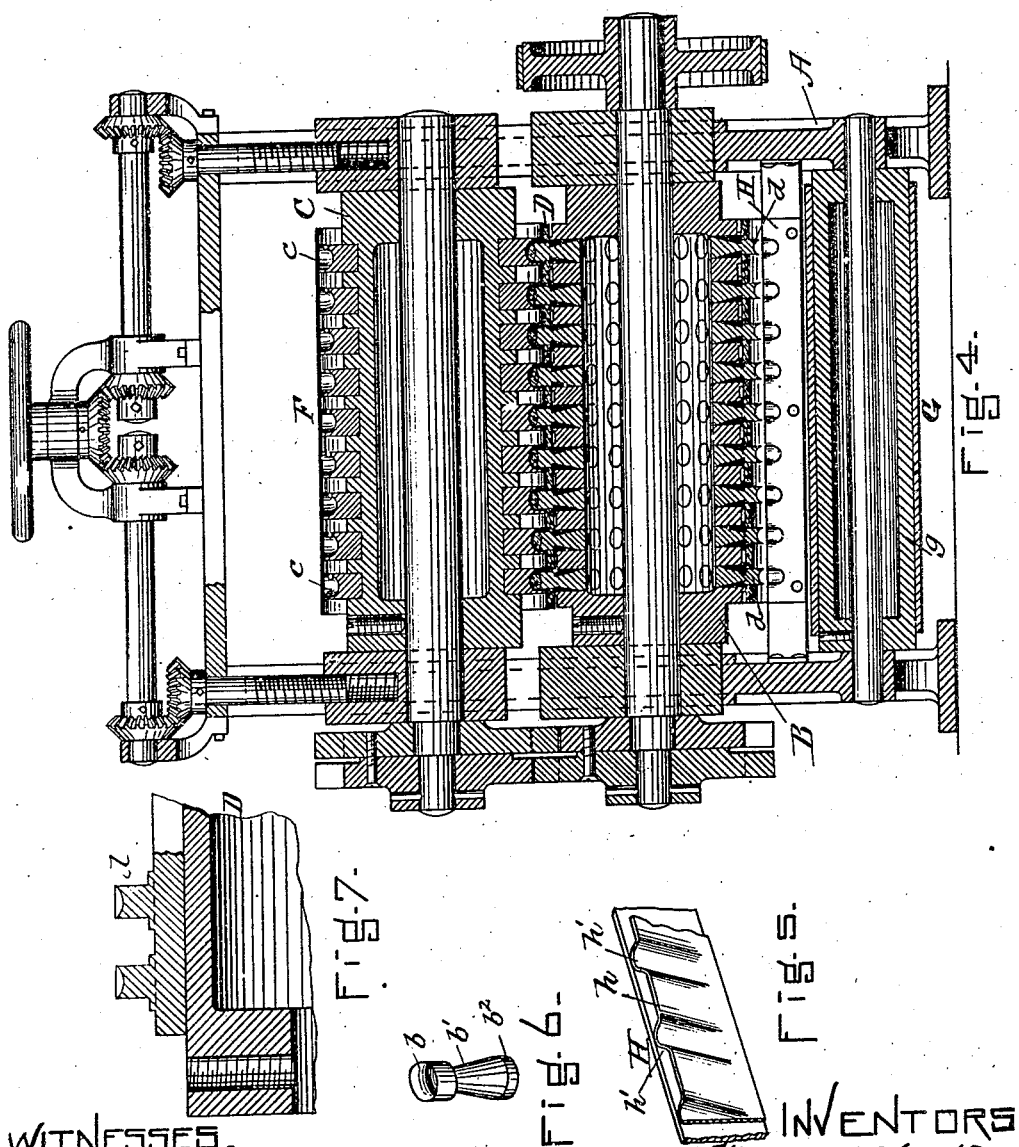

(No Model.) 3 Sheets—Sheet 3.

M. E. HUNTER & J. O. CLARK.
MACHINE FOR MOLDING OVAL OR OTHER SHAPES FROM PLASTIC MATERIAL.

No. 492,206. Patented Feb. 21, 1893.

WITNESSES.
INVENTORS.

UNITED STATES PATENT OFFICE.

MARSHALL E. HUNTER AND JOSEPH O. CLARK, OF BOSTON, MASSACHUSETTS, ASSIGNORS, BY MESNE ASSIGNMENTS, TO J. HENRY MITCHELL, OF PHILADELPHIA, PENNSYLVANIA.

MACHINE FOR MOLDING OVAL OR OTHER SHAPES FROM PLASTIC MATERIAL.

SPECIFICATION forming part of Letters Patent No. 492,206, dated February 21, 1893.

Application filed February 4, 1892. Serial No. 420,288. (No model.)

*To all whom it may concern:*

Be it known that we, MARSHALL E. HUNTER and JOSEPH O. CLARK, of Boston, in the county of Suffolk, State of Massachusetts, citizens of the United States, have invented a new and useful Improvement in Machines for Molding Oval and other Shapes from Plastic Material, of which the following is a full, clear, and exact description, reference being had to the accompanying drawings, forming a part of this specification, in explaining its nature.

The invention relates to a machine for molding oval and other shapes from plastic and formative material, and it is represented as embodied in a machine having two cylinders adapted to be rotated in unison, one of which bears a series of male dies arranged in horizontal or other lines thereon, and the other of which bears a series of female dies arranged in the same order upon it as are the male dies upon the other cylinder, and so that each one shall register with its corresponding male die as the two cylinders are rotated. There is used in connection with these rotating dies or forms means for presenting to them the plastic material in the form of sheets; also means for ejecting or removing the formed shapes from the female dies, and for removing them from the machine; also means for stripping from the male dies any of the formed shapes which may have adhered to them; also for removing from the male dies' cylinder the waste strip or that from which the shapes have been removed by the action of the dies.

The invention further relates to various features of construction and organization, all of which will hereinafter be mentioned. We refer particularly, however, at this point to the ejector or means for ejecting the formed material from the female dies, and the manner of mounting male dies in their holding cylinder. The first comprises a flexible or elastic band arranged to run between the male and female dies, and as they come together to be, by the male dies and the material from which the form is made, pushed into the cavity of the female dies during the molding operation, and to either form the bottom of said dies or rest upon a formed bottom, and upon the removal of the dies to draw, pull, or eject from the female dies the formed shapes. It is desirable to construct the male dies so that they may be readily centered in their holding cylinder in relation to the female dies, and also readily removed from it. And this is accomplished by drilling holes in the cylinder and making the dies with spindles having a tapering form from the base, which is innermost outward to the edge of the cylinder, the die being on top of the apex and preferably integral with the spindle. This spindle is placed in its cylindrical hole, and having been centered in relation to the female die is then locked in place by solder poured into its cavity about the cone. We would not, however, confine ourselves to this special means of holding the dies.

Figure 8:
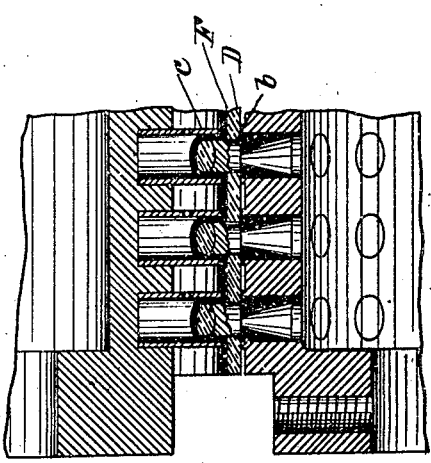

Referring to the drawings Figure 1 is a view in vertical central section of our invention embodied in a machine; Fig. 2 is a detailed view of a section of the gearing connecting the rolls. Fig. 3 is a detail view, enlarged, of a section of the cylinders, dies ejector and formative material, showing the position of the dies &c. at the end of their forming action; Fig. 4 is a view in vertical section of the machine from side to side; Fig. 5 is a view in perspective, enlarged, of the male die stripper; Fig. 6 is a view in perspective enlarged of a male die; Fig. 7 is a detail view enlarged of a section of the lower cylinder, showing a slight modification. Fig. 8 is a detail view representing the flexible ejecting band as forming the bottoms of the female dies; Fig. 9 represents a change in the relation of the supports whereby the ejecting band is also made to serve as a carrying belt.

A, is the frame of the machine.

B, is the lower or male die holding cylinder; C, is the upper or female die holding cylinder. They are mounted in blocks or slides held by the frame and are geared together to be rotated simultaneously, and the upper one is made vertically adjustable in relation to the lower. The male dies $b$ are arranged in any desired order upon the cylinder B, and the female dies $c$ are arranged upon their cylinder each to accurately register with its companion male die when they come or mesh together. These dies may have any configuration or shape desired, and we have represented them as having a suitable formation for making a circular tablet of oval shape in cross section, something like an oyster-cracker or a common form of medicinal tablet. In the form shown the cavity of the female die is sufficiently large to permit of the entrance of the male die. The female dies are represented as driven or otherwise secured in registering holes in the female die cylinder, and they are made of circular pieces of steel or other suitable material of a shape to drive or fit their circular holding holes. They have the female form modeled or shaped in their outer ends.

The male dies are represented as having the tapering spindles $b'$ extending from the circular inner end $b^2$ outward, the die proper being at the outer end of the spindle. The round section $b^2$ fits the holding hole of the male die cylinder, but not sufficiently tight to prevent the spindle from being canted a little in it, and when the male die is brought into proper registration with the female die it is rigidly locked in that position by solder or Babbitt metal poured in the cavity about the cone. This holds the dies centered, yet, at the same time permits them to be readily driven from the holes when desired, for the purpose of renewal or for other reason. We do not confine ourselves, however, to this particular manner of holding the male dies in the male die cylinder.

The plastic or formative material preferably is presented to the dies in the form of a sheet of any desired width and in the drawings D, represents this sheet. It is represented as fed to the dies by a feeding belt E, the inner end only of which is shown running over the drum $e$. Between the feed belt E and the dies is a table $e'$ over which the material is fed or drawn to or by the dies. Arranged between the two die cylinders, and rotating therewith, is the ejector band F. In the drawings it is shown as running around the female die cylinder from the delivery side of the machine and as turning with the dies. The band may be elastic, formative or flexible. Its object primarily is to eject or draw the formed article from the female die after it has left or become separated from the male die. It should be sufficiently formative or yielding to be pushed into the cavity of the female die by the material and male die, and the male die and its edges should be so shaped as to permit the band thus being pressed into the female die without injury to it.

In use, the material having been forced by the male die and with the band into the female die cavity, the further rotation of the female die cylinder separates the female die from the male die and also draws the female die from the ejecting band, so that the formed article in the female die is by the band drawn or ejected from the die. Where the band is elastic and flexible rather than flexible alone, the operation of the band is correspondingly modified. The ejected forms are dropped from the band upon the carrying belt G running over the drum $g$ by which they are removed to a suitable receptacle. Occasionally the formed or molded shapes will adhere to the male dies, and to remove them therefrom upon the carrying belt G, we have arranged below the male die cylinder the stripper plate H, having upon its face the stripper $h$, somewhat inclined to the plate H, and having in line with the dies the inward curved sections $h'$, which are of the shape of the portion of the molded forms which are presented by the male dies toward them. This prevents the form of the molded shapes from being changed in the act of stripping them from the dies.

To remove the waste material from the cylinder B there are formed in the cylinder grooves $m$ between the rows of dies, and into these grooves there are extended from the frame the scrapers M, preferably yielding. The ends of these scrapers are no thicker than the depth of the grooves, and as the cylinder B revolves with the material D upon it, the material is switched or turned from the cylinder by running upon the scrapers, see Fig. 1. It is then turned on to the short bed $m^2$ from which it runs on to a carrying belt $m^3$.

The female dies C, may be so constructed that the band F, may form the bottom of the die. See Fig. 8. That is, in the molding action the band F, is pressed into the female die cavity and forms the molding bottom of the cavity. In this event the female dies may be simply cylinders; that is, the bottom of the die does not perform any function, that function being performed by the band. Each female die, however, must have a vent hole $n$ by which air pressed into it by the band and male die may escape and through which it may enter to prevent suction upon the drawing away of the female die from the band.

In Fig. 8 we have shown a detail view of the female die and male die and band acting as the bottom of the female die.

We would say that while we have shown the female dies as mounted above the male dies, that their position may be reversed; that is the male dies may be mounted over the female dies, and with such an organization the female die and the ejector band F, are made to perform two additional functions, first to assist in the feeding of the material strip from the table $e'$ to the dies, and, second, to take the place of the belt G, in transferring the complete shapes from the dies.

In use the material is formed into sheets, and fed to the dies which are rotated together at any desired speed. The coming together of the dies removes the material which is fed between them in sufficient quantities for forming the shapes, which are immediately produced by the further coming together of the dies. Immediate separation of the dies follows and the ejection of the formed shapes takes place, the formed shapes being removed automatically from the dies, as specified, and the male dies being stripped of any of the material which may adhere to them, the waste material being removed from the under die and returned by a belt to a position to be again made up into full sheets.

A machine having substantially the features of this invention may be used for the shaping or producing of forms of any desired shape from practically all kinds of plastic or formative material.

Having thus fully described our invention, we claim and desire to secure by Letters Patent of the United States—

1. In a machine for molding shapes from plastic material the combination of two cylinders adapted to be rotated in unison, one of which carries female dies in any desired form or arrangement, and the other of which carries male dies of the arrangement of the female dies, and the band F arranged between the cylinder for conjoint action with the dies, substantially as and for the purposes described.

2. In a machine for molding plastic shapes the combination of a male die and a female die movable in relation to each other and an elastic or flexible band or strip of material arranged between the two dies and forced into the cavity of one die with the material by the other die, and upon the separation of the dies removed from said first named die to eject the formed shape therefrom, substantially as described.

3. In a machine for making shapes of formative material, the combination of a male die and a female die, with a flexible or yielding band adapted and arranged to form the bottom of the female die, the concavity of said bottom varying in accordance with the thickness of the material forced therein by the male die, substantially as described.

4. The combination in a machine for molding shapes from plastic material, of a cylinder carrying male dies, a cylinder carrying female dies which rotate in unison and engage with the male dies, a flexible or elastic band F a material carrying band E, and a table $e'$ between the band and the converging point of the dies, as and for the purposes described.

5. In a machine of the character herein specified, the combination of a cylinder B, having grooves $m$ therein, the male die being supported by said cylinder; the carrying band G, the strippers H and scrapers M arranged to enter the grooves $m$, substantially as shown and described.

6. The combination in a machine of the character specified of the cylinder B, the male dies $b'$ supported thereby, and a stripper having a stripping plate, the stripping edge of which is shaped to the configuration of the edge of the shaped article which is brought in contact therewith by the male die as and for the purposes described.

7. The combination in a machine of the character specified of the cylinder B, having dies and grooves $m$ the cylinder C having dies to engage with those of the cylinder B and the scrapers M to enter the grooves $m$ of the cylinder B, as and for the purposes described.

8. A die having a conical spindle in combination with a holder for said die provided with a cavity in which the die may be turned in either direction, and centrally secured by running metal about the conical spindle, as and for the purposes specified.

9. A female die, provided with a vent hole at or near its bottom, a flexible or elastic band over the mouth of the female die, and a male die adapted to enter the female die, the whole combined and arranged to operate, substantially as shown and described.

10. The combination of a die cylinder carrying male sections of dies, a cylinder carrying female sections of dies to engage the male sections as they are rotated, and the band F, running between the two cylinders, the said cylinders being so arranged that the said band acts as an ejector and carrier, as and for the purposes described.

11. In an organized machine for molding shapes from plastic material, the combination of the male die cylinder B, and male dies mounted thereon, the female die cylinder C, the female die $c$ mounted thereon, and rotated in unison with the male dies, the carrying band E, and the table $e'$, the scrapers M, the return belt $m^3$, the male die strippers H, the form carrying belt G, and the ejector band F; as and for the purposes described.

MARSHALL E. HUNTER.
JOSEPH O. CLARK.

Witnesses:
F. F. RAYMOND, 2d,
J. M. DOLAN.